US012646810B2

(12) United States Patent
Stock et al.

(10) Patent No.: US 12,646,810 B2
(45) Date of Patent: Jun. 2, 2026

(54) ENERGY STORAGE CELL

(71) Applicant: VARTA Microbattery GmbH, Ellwangen Jagst (DE)

(72) Inventors: Stefan Stock, Rainau-Dalkingen (DE); Martin Fuerst, Rainau-Schwabsberg (DE); David Ensling, Ellwangen (DE); Martin Elmer, Ellwangen (DE)

(73) Assignee: VARTA MICROBATTERY GMBH, Ellwangen Jagst (DE)

( * ) Notice: Subject to any disclaimer, the term of this patent is extended or adjusted under 35 U.S.C. 154(b) by 641 days.

(21) Appl. No.: 18/021,397

(22) PCT Filed: Aug. 25, 2021

(86) PCT No.: PCT/EP2021/073510
§ 371 (c)(1),
(2) Date: Feb. 15, 2023

(87) PCT Pub. No.: WO2022/048969
PCT Pub. Date: Mar. 10, 2022

(65) Prior Publication Data
US 2023/0307802 A1 Sep. 28, 2023

(30) Foreign Application Priority Data
Sep. 7, 2020 (EP) .................................... 20194940

(51) Int. Cl.
*H01M 50/578* (2021.01)
*H01M 4/75* (2006.01)
(Continued)

(52) U.S. Cl.
CPC ........... *H01M 50/578* (2021.01); *H01M 4/75* (2013.01); *H01M 50/107* (2021.01);
(Continued)

(58) Field of Classification Search
CPC ............. H01M 50/578; H01M 50/107; H01M 50/152; H01M 50/3425; H01M 50/474;
(Continued)

(56) References Cited

U.S. PATENT DOCUMENTS

2011/0104523 A1* 5/2011 Lee ........................ H01M 10/02
429/7
2011/0183161 A1* 7/2011 Son ................... H01M 10/0587
429/7
(Continued)

FOREIGN PATENT DOCUMENTS

EP 0907974 A1 4/1999
EP 3188280 A1 7/2017
(Continued)

OTHER PUBLICATIONS

International Organization for Standardization, "ISO 7806-1983", Dec. 1, 1983, pp. 1-8, Switzerland.
(Continued)

*Primary Examiner* — Adam J Francis
(74) *Attorney, Agent, or Firm* — Leydig, Voit & Mayer, Ltd.

(57) ABSTRACT
An energy storage cell includes a housing comprising a metallic, tubular housing with a circular opening. The energy storage cell further includes an electrode-separator assembly winding having two terminal end faces and a wound jacket, the electrode-separator assembly comprising an anode, a cathode, and a separator. The energy storage cell additionally includes an at least partly metallic contact element in direct contact with and connected to current collector by welding. The contact element comprises a circular edge and closes the terminal circular opening of the tubular housing portion in a gas- and liquid-tight manner. The contact element is or comprises a metallic membrane electrically connected to a current collector. The metallic
(Continued)

membrane is configured to, in response to a pressure in the housing exceeding a threshold, bend such that electrical contact between the contact element and the current collector is lost.

16 Claims, 3 Drawing Sheets

(51) Int. Cl.

| | |
|---|---|
| *H01M 50/107* | (2021.01) |
| *H01M 50/152* | (2021.01) |
| *H01M 50/342* | (2021.01) |
| *H01M 50/474* | (2021.01) |
| *H01M 50/536* | (2021.01) |
| *H01M 50/538* | (2021.01) |
| *H01M 50/56* | (2021.01) |

(52) U.S. Cl.
CPC ..... *H01M 50/152* (2021.01); *H01M 50/3425* (2021.01); *H01M 50/474* (2021.01); *H01M 50/536* (2021.01); *H01M 50/538* (2021.01); *H01M 50/56* (2021.01)

(58) Field of Classification Search
CPC .. H01M 50/536; H01M 50/538; H01M 50/56; H01M 50/169; H01M 50/188; H01M 50/545; H01M 50/566; H01M 50/179; H01M 50/46; H01M 4/75; H01M 2200/20; H01M 10/0525; H01M 10/0587; H01M 10/0422; H01M 2220/20; Y02E 60/10; Y02P 70/50
See application file for complete search history.

(56) References Cited

U.S. PATENT DOCUMENTS

| | | | | |
|---|---|---|---|---|
| 2014/0087217 A1* | 3/2014 | Zink | ................... | H01M 50/159 |
| | | | | 429/61 |
| 2016/0099443 A1* | 4/2016 | Lee | .................... | H01M 50/184 |
| | | | | 429/7 |
| 2017/0098813 A1* | 4/2017 | Yoo | ...................... | H01M 50/119 |
| 2017/0194619 A1* | 7/2017 | Kim | ................... | H01M 50/325 |
| 2019/0386272 A1* | 12/2019 | Shin | .................... | H01M 50/169 |

FOREIGN PATENT DOCUMENTS

| | | | |
|---|---|---|---|
| JP | H01189856 | A | 7/1989 |
| JP | H09320562 | A | 12/1997 |
| JP | 2004119330 | A | 4/2004 |
| JP | 2005294046 | A | 10/2005 |
| KR | 20190033900 | A | 4/2019 |
| WO | WO 2017215900 | A1 | 12/2017 |

OTHER PUBLICATIONS

Deutsches Institut Für Normung E.V., "DIN EN ISO 527 Part 3," Feb. 2019, pp. 1-13, Germany.

International Electrotechnical Commission, "IEC/EN 61951-1," Feb. 2023, pp. 1-9, Switzerland.

International Electrotechnical Commission, "IEC/EN 60622," Oct. 2002, pp. 1-18, Switzerland.

International Electrotechnical Commission, "IEC/EN 61951-2," Mar. 2017, pp. 1-48, Switzerland.

International Electrotechnical Commission, "IEC/EN 61960," Feb. 2017, pp. 1-50, Switzerland.

International Electrotechnical Commission, "IEC/EN 61056-1," Feb. 2012, pp. 1-23, Switzerland.

* cited by examiner

ENERGY STORAGE CELL

CROSS REFERENCE TO RELATED APPLICATIONS

This application is a U.S. National Phase application under 35 U.S.C. § 371 of International Application No. PCT/EP2021/073510, filed on Aug. 25, 2021, and claims benefit to European Patent Application No. EP 20194940.1, filed on Sep. 7, 2020. The International Application was published in German on Mar. 10, 2022 as WO 2022/048969 A1 under PCT Article 21(2).

FIELD

The disclosure relates to an energy storage cell comprising an electrode-separator assembly.

BACKGROUND

Electrochemical cells are able to convert stored chemical energy to electrical energy through a redox reaction. They generally comprise a positive electrode and a negative electrode that are separated from one another by a separator. During a discharge, electrons are released at the negative electrode as a result of an oxidation process. This results in an electron current that can be drawn off by an external electrical consumer, to which the electrochemical cell acts as an energy supplier. At the same time, an ion current corresponding to the electrode reaction occurs within the cell. This ion current passes through the separator and is enabled by an ion-conducting electrolyte.

If the discharge is reversible, i.e. there is the possibility of reversing the conversion of chemical energy to electrical energy that took place during the discharge, and thus of recharging the cell, the cell is called a secondary cell. The designation of the negative electrode as the anode and of the positive electrode as the cathode, which is customary in secondary cells, refers to the discharge function of the electrochemical cell.

Secondary lithium ion cells are used for many applications nowadays, since these are able to provide high currents and are notable for comparatively high energy density. They are based on the use of lithium, which is able to migrate back and forth in the form of ions between the electrodes of the cell. The negative electrode and the positive electrode of a lithium-ion cell are usually formed from what are known as composite electrodes, which, in addition to electrochemically active components, also comprise electrochemically inactive components.

Useful electrochemically active components (active materials) for secondary lithium ion cells are in principle all materials that are able to absorb lithium ions and release them again. Particles based on carbon, for example graphitic carbon, are often used here for the negative electrode. Other non-graphitic carbon materials suitable for lithium intercalation may also be used. In addition, it is also possible to use metallic and semimetallic materials that can be alloyed with lithium. For example, the elements tin, aluminum, antimony, and silicon are able to form intermetallic phases with lithium. Examples of active materials that can be used for the positive electrode include lithium cobalt oxide (LiCoO2), lithium manganese oxide (LiMn2O4), lithium iron phosphate (LiFePO4) or derivatives thereof. The electrochemically active materials are usually present in the electrodes in particle form.

As electrochemically inactive components, the composite electrodes generally comprise a current collector in two-dimensional and/or ribbon form, for example a metallic foil that serves as carrier for the respective active material. The current collector for the negative electrode (anode current collector) can be formed for example from copper or nickel and the current collector for the positive electrode (cathode current collector) can be formed for example from aluminum. In addition, the electrodes may comprise, as electrochemically inactive components, an electrode binder (e.g. polyvinylidene fluoride (PVDF) or another polymer, for example carboxymethylcellulose), conductivity-improving additives and other additions. The electrode binder ensures the mechanical stability of the electrodes and often also the adhesion of the active material to the current collectors.

Lithium ion cells generally comprise, as electrolytes, solutions of lithium salts such as lithium hexafluorophosphate (LiPF6) in organic solvents (for example ethers and esters of carbonic acid).

In the production of a lithium ion cell, the composite electrodes our combined with one or more separators to give a composite body. In this case, the electrodes and separators are joined to one another, usually under pressure, optionally also by lamination or by adhesive bonding. The fundamental ability of the cell to function can be established by impregnating the assembly with the electrolyte.

In many embodiments, the composite body is formed as a winding or processed to give a winding. In general, it comprises the following sequence: electrode/separator/ negative electrode. Frequently, composite bodies are produced as what are called bicells having the following possible sequences: negative electrode/separator/positive electrode/separator/negative electrode or positive electrode/ separator/negative electrode/separator/positive electrode.

Applications in the automotive sector, E-bikes or else other applications having a high energy demand, for example in tools, require lithium ion cells with maximum energy density that are simultaneously capable of being loaded with high currents during charging and discharging.

Frequently, cells for the applications mentioned take the form of round cylindrical cells, for example having the 21×70 shape factor (diameter×height in mm). Cells of this kind always include a composite body in the form of a winding. Modern lithium ion cells of this form factor can already achieve an energy density of up to 270 Wh/kg. However, this energy density is regarded only as an intermediate step. The market is already demanding cells having even higher energy densities.

In the development of improved electrochemical cells, however, energy density is not the only factor to be noted. Exceptionally important parameters are the internal resistance of the cells, which should be kept at a minimum, in order to reduce power losses during charging and discharging, and the thermal attachment of the electrodes, which can be essential for regulation of the cell temperature. These parameters too are very important for round cylindrical cells containing a composite body in the form of a winding. In the fast charging of cells, power losses can result in occurrence of heat buildup in the cells, which can lead to severe thermomechanical stress and consequently to deformation of and damage to the cell structure. The risk is enhanced when the electrical attachment of the current collectors is via separate electrical output conductor lugs that emerge axially from wound composite bodies, since heating can occur locally in these output conductor lugs under significant loads in the charging or discharging operation.

WO 2017/215900 A1 describes cells in which the electorate-separator assembly and the electrodes thereof are in ribbon form and in the form of a winding. The electrodes each have current collectors laden with electrode material. Electrodes of opposite polarity are arranged offset from one another within the electrode-separator assembly, such that longitudinal edges of the current collectors of the positive electrodes emerge from the winding on one side, and longitudinal edges of the current collectors of negative electrodes on another side. For electrical contact connection of the current collectors, the cell has at least one contact element that lies against one of longitudinal edges so as to result in a linear contact zone. The contact element is joined to the longitudinal edge along the linear contact zone by welding. This makes it possible to make electrical contact with the current collector and hence also the corresponding electrode over its entire length. This very significantly lowers the internal resistance within the cell described. The occurrence of high currents can be managed very much better as a result.

Regardless of that, malfunctions can arise as a result of aging, mechanical damage, incorrect charging of electrochemical cells and a few other reasons, and these can result in unwanted heating or cell gassing, as a result of which the pressure in the cell can rise in an uncontrolled manner. For such cases, electrochemical cells generally have safety solutions. In this connection, particular emphasis should be given to the use of what are called CIDs (current interrupt devices), which break electrical contact between a terminal and the electrode connected thereto in the event of excessive gas pressure within a cell.

However, CIDs are of relatively complex construction and are usually installed as an additional assembly. They thus take up a relatively large amount of space within a cell housing, which is at odds with the aim of improving energy density.

SUMMARY

In an embodiment, the present disclosure provides an energy storage cell. The energy storage cell includes a housing comprising a metallic, tubular housing portion with a terminal circular opening. The energy storage cell further includes an electrode-separator assembly in the form of a winding having two terminal end faces and a wound jacket, the electrode-separator assembly comprising an anode, a cathode, and a separator in a sequence of anode/separator/cathode. The anode is in ribbon form and includes an anode current collector in ribbon form with a first longitudinal edge and a second longitudinal edge. The cathode is in ribbon form and includes a cathode current collector in ribbon form with a first longitudinal edge and a second longitudinal edge. The anode current collector comprises a main region in strip form laden with a layer of negative electrode material and a free edge strip not laden with the negative electrode material that extends along the first longitudinal edge of the anode current collector. The cathode current collector comprises a main region in strip form laden with a layer of positive electrode material and a free edge strip not laden with the positive electrode material that extends along the first longitudinal edge of the cathode current collector. The energy storage cell additionally includes an at least partly metallic contact element in direct contact with a respective first longitudinal edge and connected to the respective first longitudinal edge by welding. The respective first longitudinal edge is the first longitudinal edge of the anode current collector or the first longitudinal edge of the cathode current collector. The electrode-separator assembly in the form of the winding is disposed in the housing and aligned axially such that the wound jacket adjoins an inside of the tubular housing portion. Within the electrode-separator assembly in the form of the winding, the anode and the cathode are formed and/or arranged with respect to one another such that the first longitudinal edge of the anode current collector surpasses one of the terminal end faces, and the first longitudinal edge of the cathode current collector surpasses the other of the terminal end faces. The contact element comprises a circular edge and closes the terminal circular opening of the tubular housing portion in a gas- and liquid-tight manner. The contact element is or comprises a metallic membrane electrically connected to one of the first longitudinal edges and configured to, in response to a pressure in the housing exceeding a threshold, bend such that electrical contact between the contact element and the respective first longitudinal edge is lost.

BRIEF DESCRIPTION OF THE DRAWINGS

Subject matter of the present disclosure will be described below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1, 2:
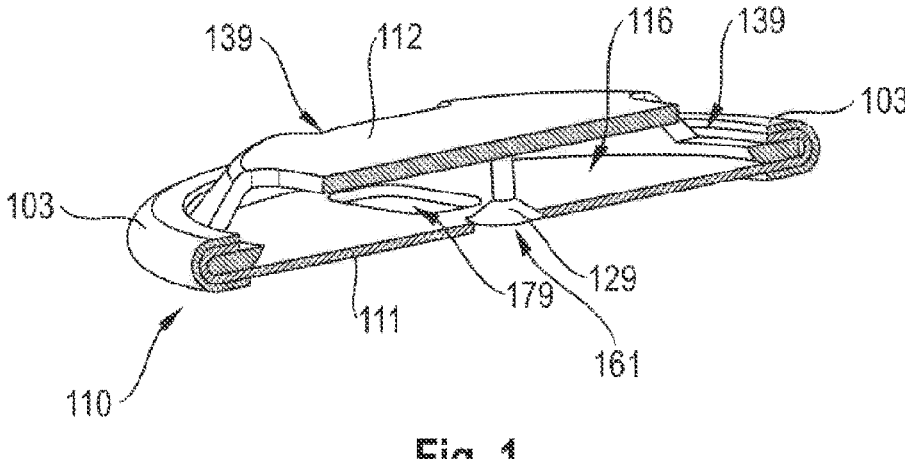
FIG. 1 provides an oblique top view, from a front, of a section of a contact element.
FIG. 2 is a partial diagram of the contact element shown in FIG. 1, and of a current collector edge fixed thereto in cross section.

The present disclosure describes energy storage cells that are notable for improved energy density compared to the prior art and homogeneous current distribution over a maximum area and length of their electrodes, and have simultaneously excellent characteristics with regard to their internal resistance and their passive cooling properties. The cells also feature improved safety and producibility.

According to a first aspect of the disclosure, an energy storage cell is provided that has at least the following features a. to j. immediately below:

a. The cell comprises an electrode-separator assembly having the sequence of anode/separator/cathode.

b. The electrode-separator assembly takes the form of a cylindrical winding having two terminal end faces and a wound jacket.

c. The cell comprises a housing comprising a metallic, tubular housing portion with a terminal circular opening.

d. In the housing, the electrode-separator assembly that takes the form of a winding is aligned axially such that the wound jacket adjoins the inside of the tubular housing portion.

e. The anode is in ribbon form and comprises an anode current collector in ribbon form with a first longitudinal edge and a second longitudinal edge.

f. The anode current collector comprises a main region in strip form, laden with a layer of negative electrode material, and a free edge strip that extends along the first longitudinal edge and is not laden with the electrode material.

g. The cathode is in ribbon form and comprises a cathode current collector in ribbon form with a first longitudinal edge and a second longitudinal edge.

h. The cathode current collector comprises a main region in strip form, laden with a layer of positive electrode material, and a free edge strip that extends along the first longitudinal edge and is not laden with the electrode material.

i. The anode and the cathode are formed and/or arranged with respect to one another within the electrode-separator assembly such that the first longitudinal edge of the anode current collector surpasses one of the terminal end faces, and the first longitudinal edge of the cathode current collector surpasses the other of the terminal end faces.

j. The cell comprises an at least partly metallic contact element which is in direct contact with one of the first longitudinal edges and which is connected to this longitudinal edge by welding.

The present disclosure relates to energy storage cells, irrespective of their electrochemical configuration. In preferred embodiments, however, the energy storage cell is a lithium ion cell, especially a secondary lithium ion cell. It is therefore possible in principle to use all electrode materials known for secondary lithium ion cells for the anode and cathode of the energy storage cell.

Active materials used in the negative electrode of an energy storage cell of the invention in the form of a lithium ion cell may be carbon-based particles such as graphitic carbon or non-graphitic carbon materials that are capable of intercalating lithium, preferably likewise in particle form. Alternatively or additionally, it is also possible for lithium titanate (Li4Ti5O12) or a derivative thereof to be present in the negative electrode, preferably likewise in particle form. In addition, the negative electrode, as active material, may contain at least one material from the group of silicon, aluminum, tin, antimony or a compound or alloy of these materials that can reversibly intercalate and deintercalate lithium, for example silicon oxide, optionally in combination with carbon-based active materials. Tin, aluminum, antimony and silicon are able to form intermetallic phases with lithium. The capacity for absorption of lithium here, especially in the case of silicon, exceeds that of graphite or comparable materials by several times. It is also possible to use thin anodes of metallic lithium.

For the positive electrode of an energy storage cell of the invention in the form of a lithium ion cell, examples of useful active materials include lithium-metal oxide compounds and lithium-metal phosphate compounds, such as LiCoO2 and LiFePO4. Also highly suitable are especially lithium nickel manganese cobalt oxides (NMC) having the molecular formula LiNixMnyCozO2 (where x+y+z is typically 1), lithium manganese spinel (LMO) having the molecular formula LiMn2O4, or lithium nickel cobalt aluminum oxide (NCA) having the empirical formula LiNixCoyAlzO2 (where x+y+z is typically 1). It is also possible to use derivatives thereof, for example lithium nickel manganese cobalt aluminum oxides (NMCA) having the empirical formula Li1.11(Ni0.40Mn0.39Co0.16Al0.05)0.89O2 or Li1+xM-O compounds and/or mixtures of the materials mentioned. The cathodic active materials too are preferably used in particulate form.

In addition, the electrodes of an energy storage cell of the invention in the form of a lithium ion cell preferably contain an electrode binder and/or an additive for improving electrical conductivity. The active materials are preferably embedded in a matrix of the electrode binder, wherein neighboring particles in the matrix are preferably in direct contact with one another. Conductivity agents serve to increase the electrical conductivity of the electrodes. Typical electrode binders are based, for example, on polyvinylidene fluoride (PVDF), polyacrylate or carboxymethylcellulose. Typical conductivity agents are carbon black and metal powders.

The energy storage cell of the invention preferably comprises an electrolyte, in the case of a lithium ion cell especially electrolyte based on at least one lithium salt, for example lithium hexafluorophosphate (LiPF6) dissolved in an organic solvent (for example in a mixture of organic carbonates or a cyclic ether such as THF or a nitrile). Other usable lithium salts are, for example, lithium tetrafluoroborate (LiBF4), lithium bis(trifluoromethanesulfonyl)imide (LiTFSI), lithium bis(fluorosulfonyl)imide (LiFSI) and lithium bis(oxalato)borate (LiBOB).

The electrode-separator assembly preferably comprises at least one separator in ribbon form, more preferably two separators in ribbon form, having or each having a first and a second longitudinal edge.

The separators are preferably formed from electrically insulating polymer films. It is preferable that the separators can be penetrated by the electrolyte. For this purpose, the polymer films used may have micropores, for example. The film may, for example, also consist of a polyolefin or a polyetherketone. It is also possible to use nonwovens and weaves made of polymer materials or other electrically insulating sheetlike structures as separator. Preference is given to using separators having a thickness in the range from 5 μm to 50 μm.

In some embodiments, the separator(s) of the composite may also be one or more layers of a solid-state electrolyte.

In the electrode-separator assembly in the form of a winding, the anode in ribbon form, the cathode in ribbon form and the separator(s) in ribbon form preferably take the form of a spiral winding. To produce the electrode-separator assembly, the electrodes in ribbon form are fed together with the separator(s) in ribbon form to a winding apparatus and preferably wound in a spiral around a winding axis therein. In some embodiments, the electrodes and the separator, for this purpose, are wound onto a cylindrical or hollow-cylindrical winding core which is situated on a winding mandrel and remains in the winding after the winding operation. The wound jacket may, for example, be formed by a polymer film or an adhesive tape. It is also possible that the wound jacket is formed by one or more separate windings.

It is preferable that the longitudinal edges of the separator(s) form the end faces of the electrode-separator assembly in the form of a winding.

It is further preferable that the longitudinal edges of the anode current collector and/or of the cathode current collector that surpass the terminal end faces of the winding project by not more than 5000 μm, preferably not more than 3500 μm, from the end faces, especially from the end faces formed by the longitudinal edges of the separator(s).

More preferably, the longitudinal edge of the anode current collector projects from the end face of the winding by not more than 2500 μm, more preferably not more than 1500 μm. More preferably, the longitudinal edge of the cathode current collector projects from the end face of the winding by not more than 3500 μm, more preferably not more than 2500 μm.

Preferably, the anode in ribbon form and the cathode in ribbon form, are offset relative to one another within the electrode-separator assembly in order to ensure that the first longitudinal edge of the anode current collector surpasses one of the terminal end faces, and the first longitudinal edge of the cathode current collector surpasses the other of the terminal end faces.

The current collectors of the energy storage cells serve to electrically contact electrochemically active components present in the respective electrode material over a maximum area. The current collectors preferably consist of a metal or are at least superficially metallized. In the case of an energy storage cell in the form of a lithium ion cell, a suitable metal for the anode current collector is, for example, copper or nickel, or else other electrically conductive materials, especially copper alloys and nickel alloys or nickel-coated metals. Stainless steel is also useful in principle. Suitable metals for the cathode current collector in the case of an energy storage cell in the form of a lithium ion cell are especially aluminum or else other electrically conductive materials, including aluminum alloys.

The anode current collector and or the cathode current collector are preferably each a metal foil having a thickness in the range from 4 μm to 30 μm, especially a metal foil in ribbon form having a thickness in the range from 4 μm to 30 μm.

As well as foils, however, current collectors used may also be other substrates in ribbon form, such as metallic or metallized nonwovens or open-pore metallic foams or expanded metals.

The current collectors are preferably laden on either side with the respective electrode material.

In some preferred configurations, the cell may be characterized by having at least one of the features a. to c. immediately below:

a. The main region in strip form of the current collector bonded by welding to the contact element has a multitude of openings.

b. The openings in the main region are round or square holes, in particular punched or drilled holes.

c. The current collector bonded by welding to the contact element is perforated in the main region, especially by round hole or slotted hole perforation.

Preferably, features a. and b. or a. and c. immediately above, more preferably the three features a. to c. immediately above, are implemented in combination with one another.

The multitude of openings results in a reduced volume and also in a reduced weight of the current collector. This makes it possible to introduce more active material into the cell and in this way to sharply increase the energy density of the cell. Increases in energy density as high as the double-digit percentage range can be achieved in this way.

In some preferred embodiments, the openings are introduced into the main region in strip form by means of a laser.

The geometry of the openings is not in principle an essential feature. What is important is that the introduction of the openings results in the mass of the current collector being reduced and in there being more space therein for active material, since the openings can be filled with the active material.

It may be very advantageous when introducing the openings to ensure that the maximum diameter of the openings is not too large. The dimensions of the openings should preferably be not more than twice the thickness of the layer of the electrode material on the respective current collector.

In preferred configurations, the cell is characterized by having the additional feature a. immediately below:

a. The openings in the current collector, particularly in the main region, have diameters within a range from 1 μm to 3000 μm.

Within this preferred range, further preference is given to diameters within a range from 10 μm to 2000 μm, preferably from 10 μm to 1000 μm, especially from 50 μm to 250 μm.

It is preferable when the cell is characterized by having at least one of the additional features a. and b. immediately below:

a. The current collector bonded by welding to the contact element, at least in a subsection of the main region, has a lower weight per unit area than the free edge strip of the same current collector.

b. The current collector bonded by welding to the contact element has fewer openings per unit area, if any, in the free edge strip compared to in the main region.

It is preferable when features a. and b. immediately above are realized in combination with one other.

The free edge strips of the anode current collector and cathode current collector delimit the main region on the side of the first longitudinal edges. Preferably, both the anode current collector and the cathode current collector each include free edge strips along both their longitudinal edges.

The openings characterize the main region. In other words, the border between the main region and the free edge strip(s) corresponds to a transition between regions having and not having openings.

The openings are preferably distributed essentially uniformly over the main region.

In further preferred embodiments, the cell is characterized by having at least one of the features a. to c. immediately below:

a. The weight per unit area of the current collector in the main region is reduced by 5% to 80% compared to the weight per unit area of the current collector in the free edge strip.

b. In the main region, the current collector has a perforated area within a range from 5% to 80%.

c. In the main region, the current collector has a tensile strength of from 20 N/mm2 to 250 N/mm2.

It is preferable when features a. to c. immediately above are realized in combination with one other.

The perforated area, which is commonly referred to also as the free cross section, can be determined in accordance with ISO 7806-1983. The tensile strength of the current collector in the main region is reduced compared to current collectors without the openings. It can be determined in accordance with DIN EN ISO 527 Part 3.

It is preferable that the anode current collector and the cathode current collector are of identical or similar design in respect of the openings. The improvements in energy density that are in each case achievable are additive. In preferred embodiments, the cell therefore furthermore has at least one of features a. to c. immediately below:

a. The main region in strip form of the anode current collector and the main region of the cathode current collector are both characterized by a multitude of openings.

b. The cell comprises the contact element bonded by welding to one of the first longitudinal edges as the first contact element, and also a second metallic contact element bonded by welding to the other of the first longitudinal edges.

It is preferable when features a. and b. immediately above are realized in combination with one other.

The above-described preferred configurations of the current collector provided with the openings are independently applicable to the anode current collector and the cathode current collector.

Particular features of the cell are the two following features k. and l.:

k. the contact element comprises a circular edge and closes the terminal circular opening of the tubular housing portion in a gas- and liquid-tight manner, and l. the contact element is or comprises a metallic membrane which is electrically connected to one of the first longitudinal edges and bends when a pressure in the housing exceeds a threshold, with loss of electrical contact of the contact element to said first longitudinal edge.

The contact element of the electrochemical storage element is thus used firstly for contacting of one of the electrodes, and simultaneously serves as housing portion. Secondly, the contact element, by virtue of the membrane, has CID functionality, with the membrane, as the central element of the CID, being connected to the electrode assembly very closely and with very low electrical resistance. By virtue of the construction described herein, compared to conventional CID constructions, it is possible to work with fewer components since some components assume multiple functions simultaneously. Particularly advantageously, more space is thus available for active material. Furthermore, cell assembly is simplified.

The loss of electrical contact with one of the first longitudinal edges is generally brought about in that the first longitudinal edge connected to the contact element breaks away from the contact element as a result of the curvature of the membrane. This preferably destroys the weld bond between the contact element and the first longitudinal edge. But it is also conceivable that the first longitudinal edge comprises an intended rupture line along which the tear occurs. Such an intended rupture line may extend, for example, along the above-described boundary between the main region provided with openings and one of the free edge strips. In the event of mechanical stress at right angles to the main direction of extension as a result of curvature of the membrane, the current collector preferentially tears along this boundary.

The metallic membrane may be formed in a particularly simple and elegant case as a spring element which, on exceedance of the threshold, is converted from a first stable state to a second stable or metastable state.

Spring elements having a stable first and stable second state are one embodiment of a bistable system. Spring elements having a stable first and metastable second state are also known by the name "clicker".

The capability of adopting the first and second stable states may preferably be brought about by an appropriate shape of the spring element. The second state is stable when the spring element remains in the second state even when the pressure within the housing drops back to a value below the pressure threshold. What is meant by "metastable", by contrast, is that the second state is automatically renounced in favor of the first state as soon as the pressure falls back below the pressure threshold.

In the case of use of a contact element comprising a membrane in the form of a spring element or designed as such, there may be an abrupt transition to the second stable or metastable state on exceedance of the threshold, with the result that one of the first longitudinal edges tears away from the contact element.

When the contact element comprises a membrane in the form of a spring element, it is preferable that the weld bond between one of the first longitudinal edges and the contact element exists exclusively between the first longitudinal edge and the membrane. When the contact element takes the form of a spring element, it is preferable that the weld bond between one of the first longitudinal edges and the contact element exists exclusively in a central region of the contact element affected by the bending.

There follows a description of some preferred embodiments of the contact element and the use thereof in preferred variants.

In a first preferred variant, the energy storage cell has at least one of the four features a. to d. immediately below:

a. The contact element comprises, as membrane, a metal disk and also a terminal cover, each of which have a circular circumference.

b. The metal disk is in direct contact with one of the first longitudinal edges and is bonded by welding to said longitudinal edge.

c. The metal disk and the terminal cover enclose an interspace into which the metal disk bends on exceedance of the threshold.

d. Disposed in the interspace is at least one spacer element that prevents bending into the interspace below the threshold and collapses and/or is compressed on exceedance of the threshold.

Preference is given to implementation of features a. and b. immediately above in combination. Particular preference is given to implementation of features a. to d. immediately above in combination.

The contact element may consist of multiple individual parts, including the metal disk, which need not necessarily all consist of metal. In a preferred embodiment, the contact element may comprise, for example, a metallic terminal cover with circular circumference, which may be welded onto the metal disk and has approximately or exactly the same diameter as the metal disk, such that the edge of the metal disk and the edge of the terminal cover collectively form the edge of the contact element. In a further embodiment, the edge of the terminal cover may be surrounded by an edge of the metal disk that has been bent radially inward. In preferred embodiments, a clamp connection may even exist between the two individual parts.

The interspace is preferably not sealed off from the environment of the cell. In general, the terminal cover comprises at least one opening through which balancing of pressure with the environment of the cell is possible. As a result, there is also no buildup of any backpressure in the interspace when the membrane bends into the interspace.

In order to prevent the metal disk from bending even at a pressure below the threshold, the spacer element is provided in the first preferred variant. This preferably abuts the metal disk at one end and the terminal cover at another end, and prevents premature bending of the membrane into the interior. It is matched to the respectively desired threshold. For example, the spacer element used may be a plastic part or a metal part that breaks or is plastically deformed at a defined pressure.

In one development of the first preferred variant, the cell has at least one of the three features a. to c. immediately below:

a. The metal disk on one of its sides has at least one depression in the form of a channel and/or dot that protrudes on the other side thereof as at least one linear and/or dot-shaped elevation.

b. The side with the at least one elevation is in direct contact with one of the first longitudinal edges.

c. The at least one elevation and the first longitudinal edge are joined via at least one weld point and/or at least one weld seam.

Particular preference is given to implementation of features a. to c. immediately above in combination.

On bending of the metal disk, the connection to the longitudinal edge coupled thereto should be separated with maximum completeness and reliability. It has been found that, surprisingly, reliable separation is possible especially in the presence of the channel-shaped and/or dot-shaped depression with simultaneous welding of the longitudinal edge to the at least one elevation. More preferably, multiple beads are formed as elongated depressions.

In order to ensure that curvature of the metal disk is possible, the metal disk should not be too thick. In general, for example, in the case of a cell with shape factor 21×70, metal disks having a thickness in the range from 0.2 to 0.4 mm meet the requirements. In the case of larger cells, metal disks having greater wall thickness should be used if appropriate. In the case of smaller cells, the wall thickness should be lowered if appropriate.

In a preferred development of the metal disk of the cell, the cell is characterized by having at least one of the two features a. and b. below:

a. The metal disk has, on one of its sides, multiple channel-shaped depressions in a preferably star-shaped arrangement that protrude as linear elevations on the other side thereof.

b. The metal disk comprises, in each of the channel-shaped depressions, at least one weld seam, preferably two parallel weld seams, as a result of welding of the metal disk to one of the first longitudinal edges.

Particular preference is given to implementation of features a. and b. immediately above in combination.

The star-shaped arrangement and the double weld seam assure good and, in particular, homogeneous binding of the metal disk to one of the first longitudinal edges.

It is possible to adjust the pressure threshold and the speed of decontacting in the case of bending of the membrane via the configuration of the weld, especially the number, size and position of the weld seams.

In a particularly preferred development of the first preferred variant, the cell has at least one of the six features a. to f immediately below:

a. The contact element comprises not only the metal disk but also a contact sheet.

b. The contact sheet is in direct contact with one of the first longitudinal edges and is bonded by welding to said longitudinal edge.

c. The contact sheet is star-shaped and comprises a center and at least three extensions in strip form, in a star-shaped arrangement.

d. The metal disk, in addition to the channel-shaped depressions, has on one of its sides a star-shaped depression with the contact sheet positioned therein.

e. At least one insulation means disposed between the metal disk and the contact sheet insulates the extensions in strip form from the metal disk.

f. The metal disk and the center of the contact sheet are bonded to one another by means of welding.

Preference is given to implementation of features a. and b. immediately above together with features e. and f. Particular preference is given to implementation of all the features a. to f immediately above in combination.

This embodiment ensures, by virtue of the additional contact sheet, virtually optimal electrode attachment without this being at the cost of lower energy density, since the solution enables a particularly space-saving arrangement of metal disk and contact sheet, since the star-shaped depression in the metal disk can accommodate the contact sheet.

In some embodiments, the contact sheet, like the metal disk, may have at least one channel-shaped and/or dot-shaped depression. However, the contact sheet is preferably flat and does not have any channel- and/or dot-shaped depressions or elevations.

The welding of the metal disk to the center of the contact sheet is preferably effected merely by means of one weld point. This facilitates decontacting in the case of bending of the membrane.

In embodiments in which features a. and b. immediately above are implemented together with features e. and f., the contact sheet need not necessarily be star-shaped. It may also be circular, for example, i.e. in the form of a disk, or polygonal.

In a second preferred variant, the energy storage cell has at least one of the five features a. to e. immediately below:

a. The contact element comprises, as membrane, a metal disk and also a terminal cover, each of which have a circular circumference.

b. The contact element comprises a contact sheet which is in direct contact with one of the first longitudinal edges and is bonded by welding to said longitudinal edge.

c. The metal disk and the terminal cover enclose an interspace into which the metal disk bends on exceedance of the threshold.

d. Disposed in the interspace is at least one spacer element that prevents bending into the interspace below the threshold and collapses and/or is compressed on exceedance of the threshold.

e. The metal disk and contact sheet are bonded directly to one another by means of welding.

Particular preference is given to implementation of features a. to e. immediately above in combination.

By contrast with the first preferred variant, there is no direct connection here between the metal disk and the first longitudinal edge. Connection exists only between the contact sheet and the first longitudinal edge.

The other constituents of the contact element and the spacer element may, in preferred embodiments, be developed as described in connection with the first preferred variant.

In a third preferred variant, the energy storage cell has at least one of the five features a. to e. immediately below:

a. The contact element comprises a metal disk having a circular circumference, and a contact sheet.

b. The contact sheet is in direct contact with one of the first longitudinal edges and is bonded by welding to said longitudinal edge.

c. The metal disk and the contact sheet are separated from one another by at least one electrically insulating spacer.

d. The metal disk comprises the metallic membrane or is formed as the membrane in some regions.

e. The membrane is in electrical contact, preferably in direct contact, with the contact sheet until exceedance of the threshold.

Particular preference is given to implementation of features a. to e. immediately above in combination.

The metal disk of the contact element need not necessarily be a separate component. For example, the base of a housing cup may also serve as metal disk of a contact element. In the third variant, the CID membrane can be integrated, for example, into the base of a housing cup. If the pressure in the cell rises above the threshold, the membrane bends outward and the electrical connection to the electrode assembly is cut. The spacer made of electrically insulating material here prevents electrical contact of the metal disk with the contact sheet. The spacer may, for example, be a plastic ring.

The membrane may be welded to the contact sheet, especially via one or more weld points. But this need not necessarily be the case, for instance when the membrane and the contact sheet are contacted via spring force.

In one development of the third preferred variant, the cell has feature a. immediately below:

a. The membrane takes the form of a spring element which, on exceedance of the threshold, is converted from a first stable state to a second stable or metastable state.

What is meant by a spring element in accordance with the disclosure has already been described above.

In principle, it is possible that the contact element, as in the case of the first preferred variant, likewise comprises a terminal cover. Correspondingly, the cell, in a possible development of the third preferred variant, has at least one of features a. and b. immediately below:

a. The contact element comprises, in addition to the metal disk, a terminal cover having a circular circumference.

b. The metal disk and the terminal cover enclose an interspace into which the membrane bends on exceedance of the threshold.

The metal disk and the terminal cover here, in preferred embodiments, are designed as described in connection with the first preferred variant.

In principle, it is possible to insert the contact element with or without a seal into the terminal circular opening of the tubular housing portion in order to seal it. Correspondingly, in a first preferred closure variant, it is preferable that a. the cell comprises an annular seal made of an electrically insulating material that surrounds the circular edge of the contact element and b. the contact element is disposed in the tubular housing portion in such a way that the annular seal adjoins the inside of the tubular housing portion along a circumferential contact zone and the contact element together with the seal seals the terminal circular opening of the tubular housing portion.

In a second closure variant, it is preferable that a. the contact element is arranged in the tubular housing portion such that the edge thereof runs along a circumferential contact zone on the inside of the tubular housing portion, and b. the edge of the contact element is joined to the tubular housing portion via a circumferential weld seam.

In order that the annular seal or the edge of the contact element can run along the circumferential contact zone on the inside, it is preferable that the tubular housing portion has a circular cross section at least in the section in which the seal adjoins it. Appropriately, this section is in hollow cylindrical form for this purpose. The internal diameter of the tubular housing portion in this region is matched correspondingly to the external diameter of the edge of the contact element, especially to the external diameter of the metal disk with the seal pulled onto it.

The closure of the cell, in the case of the contact element with the seal pulled onto the edge, can be effected by means of a beading or crimping operation, with compression of the seal.

The seal itself may be a customary polymer seal that should be chemically resistant to the electrolyte used in each case. The person skilled in the art is aware of suitable seal materials.

The effect of the first closure variant is that the contact element is electrically insulated with respect to the tubular housing portion. It forms an electrical terminal of the cell. In the case of a closure according to the second closure variant, the tubular housing portion and the contact element have the same polarity.

The weld seam in the second closure variant is preferably formed by welding of the edge of the contact element to the tubular housing portion by means of a laser. Alternatively, it is also possible in principle to fix the metal disk by soldering or adhesive bonding. In the latter case, it is possible that the contact element—as in the case of use of a seal—is electrically insulated with respect to the tubular housing portion.

The concept of the welding of the edges of current collectors to contact elements is already known from WO 2017/215900 A1 or from JP 2004-119330 A. This technology enables particularly high current durabilities and low internal resistance. With regard to methods of electrical connection of contact elements, especially also of disk-shaped contact elements, with the edges of current collectors, references therefore made completely to the content of WO 2017/215900 A1 and of JP 2004-119330 A.

In the present case, the contact of the first longitudinal edge with the contact element or with a component of the contact element results in a linear contact zone which, in the case of the spiral-wound electrodes, has a spiral progression. Along this linear and preferably spiral-shaped contact zone or transverse thereto, it is possible by means of suitable weld bonds to achieve maximum uniformity of attachment of the longitudinal edge to the contact element or to the component of the contact element.

In a preferred embodiment, the energy storage cell has at least one of the features a. and b. immediately below:

a. The tubular housing portion is part of a housing cup comprising a circular base.

b. The other of the first longitudinal edges directly adjoins the base and is bonded to the base, preferably by welding.

Particular preference is given to implementation of features a. and b. immediately above in combination.

This variant is particularly suitable for cells according to the above first closure variant. If the second closure variant is used, other than in the case of the adhesive bond mentioned, a terminal bushing is required.

The use of housing cups has long been known in the building of cell housings, for instance from WO 2017/215900 A1 that was cited at the outset. What is not known, by contrast, is the direct attachment of the longitudinal edges of a current collector to the base of a housing cup, as proposed here.

According to the present disclosure, it is thus possible and preferable to couple the current collector edges of the positive and negative electrodes that surpass opposite end faces of an electrode-separator assembly in the form of a winding each directly to a housing portion, namely the base of the cup and the above-described contact element that functions as closure element. The use of the available internal volume of the cell housing for active components thus approaches its theoretical optimum.

The coupling of the other of the first longitudinal edges to the base or to the contact sheet fundamentally follows the same construction principles as in the case of the coupling of the first longitudinal edge to the contact element. The longitudinal edge here adjoins the base or the contact sheet, so as likewise to result in a linear contact zone having a spiral progression in the case of the spiral-wound electrodes. Along this linear and preferably spiral-shaped contact zone or transverse thereto, it is possible by means of suitable weld bonds to achieve maximum uniformity of attachment of the longitudinal edge to the base.

In a further preferred embodiment, the energy storage cell has at least one of the three features a. to c. immediately below:

a. The tubular housing portion has a further terminal circular opening.

b. The cell comprises a closure element having a circular edge that closes this further tunnel opening.

c. The closure element for the further terminal opening is or comprises a metal disk, the edge of which corresponds to or forms part of the circular edge of the metallic closure element.

Particular preference is given to implementation of features a. to c. immediately above in combination.

In this embodiment, the tubular housing portion forms a housing cup together with a closure element. The housing is thus composed of three housing portions, one of which is tubular, and the other two (the contact element and the closure element) close the terminal openings of the tubular portion. In terms of production, this offers advantages since no deep drawing tools are required for the production of tubular housing portions, unlike in the case of housing cups. In the case of direct attachment of the other of the first longitudinal edges to the closure element, this fundamentally results in the same advantages as in the above-described attachment to the base of a housing cup.

The tubular housing portion in this embodiment is preferably cylindrical or hollow cylindrical. The closure element in the simplest embodiment is a metal disk with a circular circumference. Further preferably, the metal disk of the closure element may be formed in the same way as the metal disk of the contact element.

In some preferred embodiments, the closure element, especially the metal disk, may have an edge bent radially inward, such that it has a double-layer edge region with, for example, U-shaped cross section.

In a further embodiment, the closure element, especially the metal disk, may also have an edge bent by 90°, such that it has an L-shaped cross section.

In a development of these preferred embodiments, the energy storage cell has at least one of the features a. to c. immediately below:

a. The metal disk of the closure element or the metal disk that forms the closure element is arranged in the tubular housing portion such that the edge thereof runs along a circumferential contact zone on the inside of the tubular housing portion.

b. The edge of the metal disk is joined to the tubular housing portion via a circumferential weld seam.

c. The tubular housing portion comprises a circular edge bent radially inward about the edge of the closure element, especially the edge of the metal disk.

More preferably, features a. and b. immediately above, and if appropriate also features a. to c. immediately above, are implemented in combination.

In this development, it is thus preferable to fix the closure element by welding in the further terminal opening. Here too, there is no need for a separate sealing element in the case of a circumferential weld seam.

This development is preferred when the cell has been closed according to the above-described first closure variant.

The radial bending-over of the edge of the closure element is an optional measure that is not required for fixing of the closure element, but may nevertheless be appropriate.

In one development, the energy storage cell has one of the features a. and b. immediately below:

a. The other of the first longitudinal edges directly adjoins the metal disk of the closure element or the metal disk that forms the closure element and is joined to the metal disk, preferably by welding.

b. The other of the first longitudinal edges is welded to a contact sheet that directly adjoins the metal disk In principle, it is also possible here that—as in the case of the contact element—there is merely an indirect connection via a contact sheet between the longitudinal edge of the other of the first longitudinal edges and the metal disk or closure element. In this case, there is preferably direct connection by direct welding between the contact sheet and the closure element, especially the metal disk of the closure element. The contact sheet here may be configured like its counterpart in the case of the above-described contact element.

The coupling of the other of the first longitudinal edges to the metal disk or to the contact sheet of the closure element here too follows fundamentally the same construction principles as in the case of the coupling of the first longitudinal edge to the contact element. The longitudinal edge adjoins the metal disk or the contact sheet, so as to result in a linear contact zone having a spiral progression in the case of the spiral-wound electrodes. Along this linear and preferably spiral-shaped contact zone or transverse thereto, it is possible by means of suitable weld bonds to achieve maximum uniformity of attachment of the longitudinal edge to the metal disk or to the contact sheet of the closure element.

Especially when the cell is configured as a lithium ion cell, the choice of material from which the housing cup, metal disk and/or contact sheet and the closure element or the components thereof are manufactured depends on whether the anode current collector or cathode current collector is attached to the respective housing portion. Preferred materials are in principle the same as those from which the current collectors themselves are manufactured. The housing portions mentioned may thus consist, for example, of the following materials:

alloyed or unalloyed aluminum, alloyed or unalloyed titanium, alloyed or unalloyed nickel, alloyed or unalloyed copper, stainless steel (for example of the 1.4303 or 1.4404 type), nickel-plated steel.

In addition, the housing and components thereof may consist of multilayer materials ("clad materials"), for example comprise one layer of a steel and one layer of aluminum or copper. The layer of aluminum or the layer of copper in these cases forms, for example, the inside of the housing cup or the base of the housing cup.

Further suitable materials are known to the person skilled in the art.

In the free edge strip, the metal of the respective current collector is preferably free of the respective electrode material. In some preferred embodiments, the metal of the respective current collector is uncovered there, such that it is available for electrical contact connection, for example by the abovementioned welds to the contact element or closure element.

In some further embodiments, the metal of the respective current collector, in the free edge strips, may alternatively be coated at least in some regions with a support material which is of greater thermal stability than the current collector coated therewith and which differs from electrode material disposed on the respective current collector.

What is meant here by "of greater thermal stability" is that the support material retains its solid state at a temperature at which the metal of the current collector melts. It thus either has a higher melting point than the metal or else it sublimes or breaks down only at a temperature at which the metal has already melted.

The support material may in principle be a metal or a metal alloy if it has a higher melting point than the metal of which the surface coated with the support material consists. In many embodiments, however, the energy storage cell preferably has at least one of features a. to d. immediately below:

a. The support material is a nonmetallic material.
b. The support material is an electrically insulating material.
c. The nonmetallic material is a ceramic material, a glass-ceramic material or a glass.
d. The ceramic material is aluminum oxide ($Al_2O_3$), titanium oxide ($TiO_2$), titanium nitride (TiN), titanium aluminum nitride (TiAlN), a silicon oxide, especially silicon dioxide ($SiO_2$), or titanium carbonitride (TiCN).

The support material is preferably according to feature b. immediately above, and is preferably according to feature d. immediately above.

The term "nonmetallic material" especially encompasses plastics, glasses and ceramic materials.

The term "electrically insulating material" in the present context should be interpreted broadly. In principle, it encompasses any electrically insulating material, especially including said polymers.

The term "ceramic material" in the present context should be interpreted broadly. In particular, this is understood to mean carbides, nitrides, oxides, silicides or mixtures and derivatives of these compounds.

The term "glass-ceramic material" especially means a material comprising crystalline particles embedded into an amorphous glass phase.

The term "glass" in principle means any inorganic glass that meets the above-defined criteria for thermal stability and is chemically stable with respect to any electrolyte present in the cell.

More preferably, the anode current collector consists of copper or a copper alloy, while the cathode current collector simultaneously consists of aluminum or an aluminum alloy, and the support material is aluminum oxide or titanium oxide.

It may further be preferable that the free edge strip of the anode current collector and/or cathode current collector is coated with a strip of the support material.

The main regions, especially the main regions in strip form of anode current collector and cathode current collector, preferably extend parallel to the respective edges or longitudinal edges of the current collectors. Preferably, the main regions in strip form extend over at least 90%, more preferably over at least 95%, of the areas of anode current collector and cathode current collector.

In some preferred embodiments, the support material is applied in the form of a strip or a line immediately alongside the main regions that are preferably in strip form, but does not fully cover the exposed regions, such that the metal of the respective current collector is exposed immediately along the longitudinal edge.

The energy storage cell may be a button cell. Button cells are cylindrical and have a height that is less than their diameter. The height is preferably within a range from 4 mm to 15 mm. It is further preferable that the button cell has a diameter within a range from 5 mm to 25 mm. Button cells are suitable, for example, for supplying electrical energy to small electronic devices such as watches, hearing aids, and wireless headphones.

The nominal capacity of such a button cell in the form of a lithium ion cell is generally up to 1500 mAh. The nominal capacity is preferably within a range from 100 mAh to 1000 mAh, more preferably within a range from 100 to 800 mAh.

More preferably, however, the energy storage cell is a cylindrical round cell. Cylindrical round cells have a height that is greater than their diameter. They are especially suitable for the applications cited at the outset with a high energy demand, for example in the automotive sector or for E-bikes or for power tools.

The height of energy storage cells in the form of a round cell is preferably within a range from 15 mm to 150 mm. The diameter of the cylindrical round cells is preferably within a range from 10 mm to 60 mm. Within these ranges, shape factors of, for example, 18×65 (diameter×height in mm) or 21×70 (diameter×height in mm) or 32×700 (diameter×height in mm) or 32×900 (diameter×height in mm) are preferred. Cylindrical round cells having these shape factors are particularly suitable for powering electric drives in motor vehicles.

The nominal capacity of the cylindrical round cell in the form of a lithium ion cell is preferably up to 90 000 mAh. With the shape factor of 21×70, the cell in one embodiment as a lithium-ion cell preferably has a nominal capacity within a range from 1500 mAh to 7000 mAh, more preferably within a range from 3000 to 5500 mAh. With the shape factor of 18×65, the cell in one embodiment as a lithium-ion cell preferably has a nominal capacity within a range from 1000 mAh to 5000 mAh, more preferably within a range from 2000 to 4000 mAh.

In the European Union, manufacturer information on the nominal capacities of secondary batteries is strictly regulated. For instance, information on the nominal capacity of secondary nickel-cadmium batteries is based on measurements in accordance with standards IEC/EN 61951-1 and IEC/EN 60622, information on the nominal capacity of secondary nickel-metal hydride batteries on measurements in accordance with standard IEC/EN 61951-2, information on the nominal capacity of lithium secondary batteries on measurements in accordance with standard IEC/EN 61960, and information on the nominal capacity of lead-acid secondary batteries on measurements in accordance with standard IEC/EN 61056-1. Any figures for nominal capacities are preferably likewise based on these standards.

The anode current collector, the cathode current collector and the separator, in embodiments in which the cell is a cylindrical round cell, are preferably in ribbon form and preferably have the following dimensions:
a length in the range from 0.5 m to 25 m
a width in the range from 30 mm to 145 mm
The free edge strip that extends along the first longitudinal edge and is not laden with the electrode material in these cases preferably has a width of not more than 5000 μm.

In the case of a cylindrical round cell having the shape factor 18×65, the current collectors preferably have
a width of 56 mm to 62 mm, preferably of 60 mm, and
a length of not more than 2 m, preferably of not more than 1.5 m.

In the case of a cylindrical round cell having the shape factor 21×70, the current collectors preferably have a width of 56 mm to 68 mm, preferably of 65 mm, and a length of not more than 3 m, preferably of not more than 2.5 m.

In a preferred embodiment, the energy storage cell has the following additional feature:

a. The contact element comprises a safety valve via which pressure can escape from the housing on exceedance of a further pressure threshold.

This safety valve may, for example, be a bursting membrane, a bursting cross or similar intended rupture site, which can tear open in the event of a defined positive pressure in the cell in order to prevent a cell explosion.

More preferably, the metal disk of the contact element may include the safety valve, especially in the form of an intended rupture site.

The use of a contact element that firstly serves for contact connection of one of the electrodes and simultaneously as housing portion and has CID functionality is not restricted to energy storage cells with a cylindrical housing. Instead, it is also possible for energy storage elements that comprise a stack surrounded by a prismatic housing and formed from two or more identical electrode-separator assemblies to comprise such a contact element.

The disclosure therefore also encompasses an energy storage element having features a. to l. immediately below:

a. The energy storage element comprises at least two electrode-separator assemblies with the sequence of anode/separator/cathode.

b. The anodes of the assemblies are preferably rectangular and each comprise an anode current collector with an anode current collector edge.

c. The anode current collectors each comprise a main region laden with a layer of negative electrode material, and a free edge strip that extends along the respective anode current collector edge and is not laden with the electrode material.

d. The cathodes of the assemblies are preferably rectangular and each comprise a cathode current collector with a cathode current collector edge.

e. The cathode current collectors each have a main region laden with a layer of positive electrode material, and a free edge strip that extends along the respective cathode current collector edge and is not laden with the electrode material.

f. The at least two electrode-separator assemblies are in stacked form, wherein the stack of the assemblies has two terminal ends.

g. The stack of the electrode-separator assemblies is surrounded by a prismatic housing.

h. The anodes and the cathodes are designed and/or arranged relative to one another such that the anode current collector edges protrude from one of the terminal ends and the cathode current collector edges from the other of the terminal ends.

i. The energy storage element has a metallic contact element in direct contact with these anode current collector edges or these cathode current collector edges.

j. The contact element is bonded by welding to the edges with which it is in direct contact.

k. The contact element serves as part of the housing.

l. The contact element comprises a metallic membrane which is electrically connected to the edges bonded to the contact element by welding and bends when a pressure in the housing exceeds a threshold, with loss of electrical contact to these edges.

In respect of the contact element and components thereof, the same preferred developments are applicable as in the case of the energy storage cell.

FIG. 1 and FIG. 2 show a contact element 110 comprising the metal disk 111, the metallic terminal cover 112, the seal 103 and the spacer element 129. The metal disk 111 and the terminal cover 112 each have a circular circumference. The edge of the terminal cover 112 is surrounded by the edge of the metal disk 111 that has been bent radially inward. The edge of the metal disk 111 and the edge of the terminal cover 112 collectively form the edge of the contact element 110. The seal 103 has been pulled over the edge of the contact element.

The spacer element closes an opening 161 that can serve for introduction of electrolyte into a cell housing. In order to assure a liquid-tight seal, the spacer element 129 for this purpose may be welded or soldered to the metal disk 111.

The metal disk 111 and the terminal cover 112 enclose the interspace 116. The metal disk 111 may bend into this interspace 116 when a pressure acts on the underside thereof. In the installed state, the underside faces into the interior of the cell housing.

The interspace 116 is not closed; instead, the terminal cover 112 comprises at least one opening 139 through which pressure can be balanced with the environment of a cell equipped with the contact element 110. As a result, there is also no buildup of any backpressure in the interspace 116 when the metal disk 111 that functions as membrane bends into the interspace 116.

In order to prevent the metal disk 111 from bending even at pressures below the threshold, the spacer element 129 is provided. This preferably abuts the metal disk 111 at one of its ends and the terminal cover 112 at another end, and prevents premature bending of the membrane into the interior 116. For example, the spacer element 129 may be a plastic part or a metal part that breaks or is plastically deformed at a defined pressure on the membrane.

The metal disk 111 has a channel-shaped depression 179 in the form of a bead. In the region of this bead, the current collector edge 115a is welded on.

Figure 3:
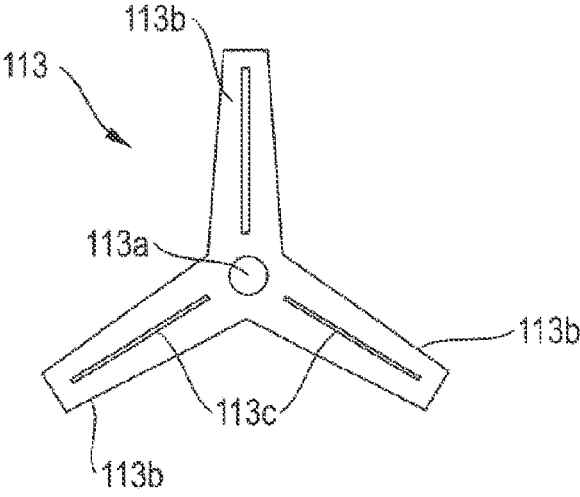
FIG. 3 provides a top view of a contact sheet.

The contact sheet 113 shown in FIG. 3 is star-shaped and comprises a center 113a and three extensions 113b in strip form, in a star-shaped arrangement. The contact sheet 113 may be welded to the edge of a current collector along the lines 113c on the extensions 113b in strip form. The contact sheet may have been stamped out of a sheet, for example, and is preferably flat.

Figure 4:
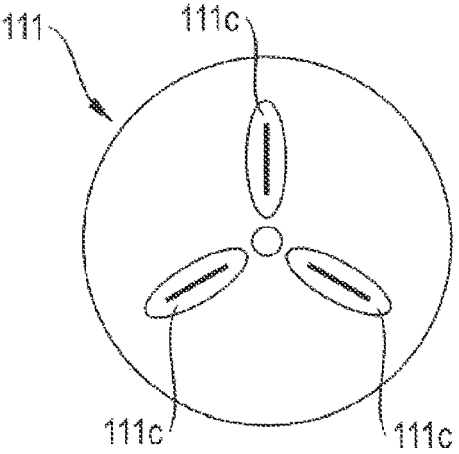
FIG. 4 provides a top view of a metal disk of a contact element.

The metal disk 111 shown in FIG. 4 comprises three elongated beads 111c that are intended to improve the contact connection to the edge of a current collector. The beads 111c are likewise arranged in a star shape. The metal disk 111 may be welded to the edge of a current collector along the lines within the beads 111c.

Figure 5:
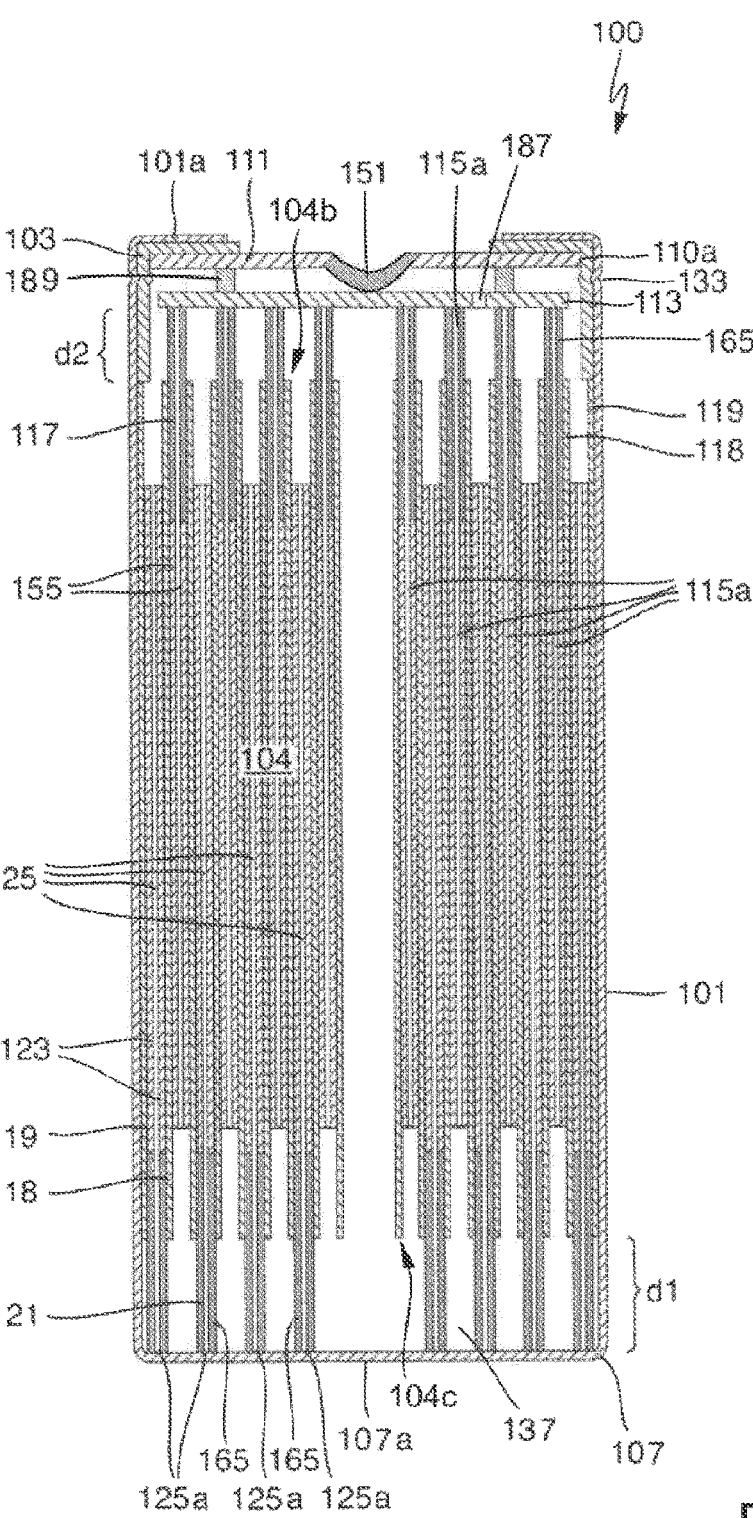
FIG. 5 is a cross-sectional diagram of an energy storage cell.

The energy storage cell 100 shown in FIG. 5 comprises a hollow cylindrical housing portion 101 which is part of the housing cap 107 that comprises the circular base 107a and a circular opening (defined by the edge 101a). The housing cup 107 is a deep-drawn part. The housing cup 107 together with the contact element 110 encloses an interior 137 in which the electrode-separator assembly 104 in the form of a winding is aligned axially. The contact element 110 encompasses the metal disk 111 with a circular edge and the contact sheet 113.

The electrode-separator assembly 104 takes the form of a cylindrical winding having two terminal end faces, between which the circumferential wound jacket extends, which adjoins the inside of the hollow cylindrical housing portion 101. It is formed from a positive electrode and a negative electrode, and the separators 118 and 119, which are each in ribbon form and wound in a spiral.

The two end faces 104b and 104c of the electrode-separator assembly 104 are formed by the longitudinal edges of the separators 118 and 119. The current collectors 115 and 125 project from these end faces. The corresponding excess lengths are identified as d1 and d2. In order to ensure that the current collectors 115 and 125 can project from the end faces 104b and 104c, the anode in ribbon form and the cathode in ribbon form are in an offset arrangement relative to one another within the electrode-separator assembly 104.

The anode current collector 115 protrudes from the upper end face 104b of the electrode-separator assembly 104, and the cathode current collector 125 from the lower end face 104c. The anode current collector 115, in a main region in strip form, is laden with a layer of a negative electrode material 155. The cathode current collector 125, in a main region in strip form, is laden with a layer of a positive electrode material 123. The anode current collector 115 has an edge strip 117 which extends along its longitudinal edge 115a and which is not laden with the electrode material 155. Instead, a coating 165 of a ceramic support material is applied here, which stabilizes the current collector in this region. The cathode current collector 125 has an edge strip 121 which extends along its longitudinal edge 125a and which is not laden with the electrode material 123. Instead, the coating 165 of the ceramic support material is applied here too.

The edge 115a of the anode current collector 115 is in direct contact over its entire length with the contact sheet 113 and is bonded thereto by welding. The contact element 110 thus serves simultaneously for electrical contact connection of the anode and as housing portion.

The edge 125a of the cathode current collector 125 is in direct contact over its entire length with the base 107a and is bonded thereto by welding. The base 107a thus serves not only as part of the housing but also for electrical contact connection of the cathode.

The housing portions 101 and 110 are electrically insulated from one another by the seal 103. The edge 101a of the housing portion 101 is bent radially inward about the edge of the metal disk 111 which is surrounded by the seal 103 and fixes said metal disk 111 in the circular opening of the tubular housing portion 101. The tubular housing portion 101, in axial direction, comprises a section in which the circumferential wound jacket 104a adjoins the inside thereof, and a contact section in which the annular seal 103 adjoins the inside thereof. The annular seal 103 is in compressed form in the contact section as a consequence of a pressure which is exerted thereon by the edge 110a of the contact element 110 and the inside of the tubular housing portion 101.

Immediately below the contact section, the housing portion 101 has the circumferential bead 133. The bead 133 is not very pronounced and projects by less than one housing wall thickness into the interior 137 on the inside of the housing portion 101.

The metal disk 111, in the center thereof, encompasses the metallic membrane 151 in the form of a bistable spring element. The membrane 151 bends into the interior 137, where it makes contact with the contact sheet 113. If the pressure in the interior 137 exceeds a threshold, the membrane 151 bends outward, and the electrical connection between the metal disk 111 and the contact sheet 113 is cut.

In order to ensure that electrical contact between the metal disk 111 and the contact sheet 113 is possible exclusively via the membrane 151, the contact element 110 further comprises the spacer 189. This is a plastic ring.

The contact sheet 113 comprises a hole 187 in order to ensure that the space bounded by the spacer 189, the contact sheet 113 and the metal disk 111 is in communicating connection with the interior 137.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An energy storage cell, comprising:

a housing comprising a metallic, tubular housing portion with a terminal circular opening;

an electrode-separator assembly in the form of a winding having two terminal end faces and a wound jacket, the electrode-separator assembly comprising an anode, a cathode, and a separator in a sequence of anode/separator/cathode, the anode being in ribbon form and comprising an anode current collector in ribbon form with a first longitudinal edge and a second longitudinal edge, the cathode being in ribbon form and comprising a cathode current collector in ribbon form with a first longitudinal edge and a second longitudinal edge, wherein the anode current collector comprises a main region in strip form laden with a layer of negative electrode material and a free edge strip not laden with the negative electrode material that extends along the first longitudinal edge of the anode current collector, wherein the cathode current collector comprises a main region in strip form laden with a layer of positive electrode material and a free edge strip not laden with the positive electrode material that extends along the first longitudinal edge of the cathode current collector; and an at least partly metallic contact element in direct contact with a respective first longitudinal edge and connected to the respective longitudinal edge by welding, wherein the respective first longitudinal edge is the first longitudinal edge of the anode current collector or the first longitudinal edge of the cathode current collector, wherein the electrode-separator assembly in the form of the winding is disposed in the housing and aligned axially such that the wound jacket adjoins an inside of the tubular housing portion, wherein, within the electrode-separator assembly in the form of the winding, the anode and the cathode are formed and/or arranged with respect to one another such that the first longitudinal edge of the anode current collector surpasses one of the terminal end faces, and the first longitudinal edge of the cathode current collector surpasses the other of the terminal end faces, wherein the contact element comprises a circular edge and closes the terminal circular opening of the tubular housing portion in a gas- and liquid-tight manner, and wherein the contact element is or comprises a metallic membrane electrically connected to the respective first longitudinal edge and configured to, in response to a pressure in the housing exceeding a threshold, bend such that electrical contact between the contact element and the respective first longitudinal edge is lost.

2. The energy storage cell as claimed in claim 1, wherein the contact element comprises, as the metallic membrane, a metal disk and further comprises a terminal cover, each of the metal disk and the terminal cover having a circular circumference, wherein the metal disk is in direct contact with the respective first longitudinal edge and is bonded by welding to the respective first longitudinal edge, wherein the metal disk and the terminal cover enclose an interspace into which the metal disk is, in response to the pressure in the housing exceeding the threshold, configured to bend, and wherein at least one spacer element is disposed in the interspace and configured to prevent the metal disk from bending into the interspace when the pressure in the housing is below the threshold, and wherein the at least one spacer element is configured to collapse and/or compress in response to the pressure in the housing exceeding the threshold.

3. The energy storage cell as claimed in claim 2, wherein at least one of:

the metal disk on one of its sides has at least one depression in a form of a channel and/or a dot that protrudes on another side of the metal disk as at least one linear and/or dot-shaped elevation, the metal disk adjoins the first respective longitudinal edge by the side having the at least one elevation, and/or the at least one elevation and the respective first longitudinal edge are joined via at least one weld point and/or at least one weld seam.

4. The energy storage cell as claimed in claim 3, wherein the metal disk has, on one of its sides, multiple channel-shaped depressions that protrude as linear elevations on the other side thereof, and wherein the metal disk comprises, in each of the channel-shaped depressions, at least one respective weld seam as a result of welding of the metal disk to the respective first longitudinal edge.

5. The energy storage cell as claimed in claim 2, wherein at least one of:

the contact element further comprises a contact sheet, the contact sheet is in direct contact with the respective first longitudinal edge and is bonded to the respective first longitudinal edge by welding, the contact sheet is star-shaped and comprises a center and at least three strip-shaped extensions in a star-shaped arrangement, the metal disk, in addition to the channel-shaped depressions, has on one of its sides a star-shaped depression with the contact sheet positioned therein, at least one insulator is disposed between the metal disk and the contact sheet, the at least one insulator being configured to insulate the extensions in strip form from the metal disk, and/or the metal disk and the center of the contact sheet are bonded directly to one another by welding.

6. The energy storage cell as claimed in claim 1, wherein the contact element comprises, as the membrane, a metal disk and further comprises a terminal cover, each of the membrane and the metal disk having a circular circumference, wherein the contact element comprises a contact sheet in direct contact with the respective first longitudinal edge and bonded by welding to the respective first longitudinal edge, wherein the metal disk and the terminal cover enclose an interspace into which the metal disk is configured to bend in response to the pressure in the housing exceeding the threshold, wherein at least one spacer element is disposed in the interspace, the at least one spacer element being configured to prevent the metal disk from bending into the interspace when the pressure in the housing falls below the threshold, wherein the at least one spacer element is configured to collapse and/or compress in response to the pressure in the housing exceeding the threshold, and wherein the metal disk and contact sheet are bonded directly to one another by welding.

7. The energy storage cell as claimed in claim 1, wherein the contact element comprises a metal disk, having a circular circumference, and a contact sheet, wherein the contact sheet is in direct contact with the respective first longitudinal edge and is bonded by welding to the respective longitudinal edge, wherein the metal disk and the contact sheet are separated from one another by at least one electrically insulating spacer, wherein the metal disk comprises the metallic membrane or is formed as the metallic membrane in some regions, and wherein the membrane is in electrical contact with the contact sheet until the pressure in the housing exceeds the threshold.

8. The energy storage cell as claimed in claim 7, wherein the membrane takes the form of a spring element which, on exceedance of the threshold, is converted from a first stable state to a second stable or metastable state.

9. The energy storage cell as claimed in claim 7, wherein the contact element comprises, in addition to the metal disk, a terminal cover having a circular circumference, and wherein the metal disk and the terminal cover enclose an interspace into which the membrane is configured to bend in response to the pressure in the housing exceeding the threshold.

10. The energy storage cell as claimed in claim 1, further comprising:

an annular seal made of an electrically insulating material that surrounds the circular edge of the contact element, wherein the contact element together with the annular seal are disposed in the tubular housing portion such that the annular seal adjoins the inside of the tubular housing portion along a circumferential contact zone and the contact element, together with the seal, seals the terminal circular opening of the tubular housing portion.

11. The energy storage cell as claimed in claim 1, wherein the contact element is arranged in the tubular housing portion such that the edge thereof runs along a circumferential contact zone on an annular seal disposed on the inside of the tubular housing portion.

12. The energy storage cell as claimed in claim 1, wherein the contact element comprises a safety valve configured to allow pressure to escape from the housing in response to the pressure in the housing exceeding a second threshold.

13. The energy storage cell as claimed in claim 1, wherein the metallic membrane is provided in a form of a spring element which, in response to the pressure in the housing exceeding the threshold, is converted from a first stable state to a second stable or metastable state.

14. The energy storage cell as claimed in claim 1, wherein a stabilizing coating is applied to an edge strip extending along the respective first longitudinal edge.

15. The energy storage cell as claimed in claim 14, wherein the stabilizing coating is a ceramic support material.

16. The energy storage cell as claimed in claim 14, wherein the stabilizing coating comprises a material having a higher melting point than the anode current collector or the cathode current collector.

\* \* \* \* \*